US008666976B2

(12) United States Patent
Merz

(10) Patent No.: US 8,666,976 B2
(45) Date of Patent: Mar. 4, 2014

(54) METHODS AND SYSTEMS FOR IMPLEMENTING APPROXIMATE STRING MATCHING WITHIN A DATABASE

(75) Inventor: Christopher J. Merz, Wildwood, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/533,627

(22) Filed: Jun. 26, 2012

(65) Prior Publication Data

US 2012/0271827 A1 Oct. 25, 2012

Related U.S. Application Data

(63) Continuation-in-part of application No. 13/041,075, filed on Mar. 4, 2011, now Pat. No. 8,219,550, which is a continuation of application No. 11/967,494, filed on Dec. 31, 2007, now Pat. No. 7,925,652.

(51) Int. Cl.
*G06F 7/00* (2006.01)

(52) U.S. Cl.
USPC .......................................... 707/727

(58) Field of Classification Search
USPC .......................................... 707/727
See application file for complete search history.

(56) References Cited

U.S. PATENT DOCUMENTS

| 6,006,221 | A | 12/1999 | Liddy et al. |
| 6,073,095 | A | 6/2000 | Dharanipragada et al. |
| 6,167,369 | A | 12/2000 | Schulze |
| 7,206,303 | B2 | 4/2007 | Karas et al. |
| 7,216,073 | B2 | 5/2007 | Lavi et al. |
| 7,290,048 | B1 | 10/2007 | Barnett et al. |
| 7,328,211 | B2 | 2/2008 | Bordner et al. |
| 2002/0099536 | A1* | 7/2002 | Bordner et al. .................. 704/10 |
| 2002/0124015 | A1 | 9/2002 | Cardno et al. |
| 2002/0161647 | A1 | 10/2002 | Gailey et al. |
| 2003/0195890 | A1* | 10/2003 | Oommen ....................... 707/100 |

(Continued)

FOREIGN PATENT DOCUMENTS

KR 20070028664 A 3/2007

OTHER PUBLICATIONS

Notification of Transmittal of The International Search Report and The Written Opinion of the International Searching Authority, or the Declaration mailed Apr. 20, 2009, PCT/US2008/85585 (9 pages).

(Continued)

*Primary Examiner* — Truong Vo
(74) *Attorney, Agent, or Firm* — Armstrong Teasdale LLP

(57) ABSTRACT

A computer-based method for character string matching of a candidate character string with a plurality of character string records stored in a database is described. The method includes performing a clustering operation on at least a portion of the plurality of character string records, the clustering operation generating a plurality of clusters, each cluster comprising a plurality of character strings from the plurality of character string records, the plurality of character strings in each cluster are determined to be similar with respect to each other based on at least one characteristic of the plurality of character strings. The method also includes generating a set of reference character strings that are selected from the plurality of character strings in each cluster, generating an n-gram representation for one of the reference character strings in the set of reference character strings, and generating an n-gram representation for the candidate character string.

20 Claims, 9 Drawing Sheets

(56) References Cited

U.S. PATENT DOCUMENTS

| | | |
|---|---|---|
| 2004/0167888 A1 | 8/2004 | Kayahara et al. |
| 2004/0260694 A1 | 12/2004 | Chaudhuri et al. |
| 2005/0278292 A1 | 12/2005 | Ohi et al. |
| 2006/0277130 A1 | 12/2006 | Harmon |
| 2007/0073745 A1 | 3/2007 | Scott et al. |
| 2007/0162481 A1 | 7/2007 | Millett |
| 2007/0192872 A1 | 8/2007 | Rhoads et al. |
| 2007/0276841 A1 | 11/2007 | Rhoads et al. |
| 2007/0276928 A1 | 11/2007 | Rhoads et al. |
| 2009/0171955 A1 | 7/2009 | Merz et al. |
| 2009/0234852 A1 | 9/2009 | Mola |
| 2010/0005096 A1 | 1/2010 | Minagawa et al. |
| 2010/0205123 A1 | 8/2010 | Sculley et al. |
| 2011/0231446 A1 | 9/2011 | Buhler et al. |

OTHER PUBLICATIONS

R.H Van Leuken et al: "Selecting vantage objects for similarity indexing", 18th International Conference on Pattern Recognition, vol. 3, Jan. 1, 2006, pp. 453-456.

Hjaltason G R et al: "Properties of embedding methods for similarity searching in metric spaces", IEEE Transactions on Pattern Analysis and Machine Intelligence, vol. 25, No. 5, May 1, 2003, pp. 530-549.

Owolabi O et al: "Fast approximate string matching", Software Practice and Experience, Wiley and Sons, Bognor Regis, GB, vol. 18, No. 4, Apr. 1, 1988, pp. 387-393.

Supplementary European Search Report, EP 08 86 7650.8, dated Nov. 22, 2012, (9 pages).

International Search Report and Written Opinion, dated Oct. 18, 2013, for copending International Application No. PCT/US2013/047577.

\* cited by examiner

High Level Ensemble Prediction Process Overview

METHODS AND SYSTEMS FOR IMPLEMENTING APPROXIMATE STRING MATCHING WITHIN A DATABASE

CROSS REFERENCE TO RELATED APPLICATIONS

This application is a continuation-in-part application, which claims the benefit of U.S. patent application Ser. No. 13/041,075 filed on Mar. 4, 2011, now U.S. Pat. No. 8,219,550 entitled "Methods And System For Implementing Approximate String Matching Within A Database", which is a continuation application of application Ser. No. 11/967,494 filed on Dec. 31, 2007, now U.S. Pat. No. 7,925,652, the disclosures of which are incorporated by reference.

BACKGROUND OF THE INVENTION

This invention relates generally to merchant prediction systems, and more specifically, to methods and systems for implementing approximate string matching within a database in relation to joining database records contained within a bankcard network.

Historically, the use of "charge" cards for consumer transaction payments was at most regional and based on relationships between local credit issuing banks and various local merchants. The payment card industry has since evolved with the issuing banks forming associations (e.g., MasterCard) and involving third party transaction processing companies (e.g., "Merchant Acquirers") to enable cardholders to widely use charge cards at any merchant's establishment, regardless of the merchant's banking relationship with the card issuer.

For example, FIG. 1 of the present application shows an exemplary multi-party payment card industry system for enabling payment-by-card transactions. As illustrated, the merchants and issuer do not necessarily have to have a one-to-one relationship. Yet, various scenarios exist in the payment-by-card industry today, where the card issuer has a special or customized relationship with a specific merchant, or group of merchants.

Over 25 million merchants accept a form of payment card. One of the associations houses name and address information for thousands of merchants and merchant locations in what is referred to herein as a data warehouse. At the merchant location level, there are millions of entries in this data warehouse. Many of the location entries are known to be duplicates due to fluctuations in name and/or address information in the transaction data. For example, the same street address can be written in a variety of ways, all of which are valid (e.g., 400 South Fourth Street, 400 S. Fourth St., 400 South $4^{th}$ Street, etc.). Names can sometimes also be represented in a number of ways, all being valid. Current database technology is very limited in its ability to identify entries with similar field values such as name and address. Thus, many near duplicate merchant names and merchant locations are entered into the data warehouse.

In a typical processing day for the association, there are about 15,000 candidate locations (e.g., new merchant locations) that need to be checked for matches against approximately five million location entries already within the data warehouse. The checking for matches serves at least two purposes. One, locations with similar names and/or addresses can be identified as one entity, rather than several. Additionally, if the names or addresses are too different, the association can determine that an entity has moved, or that one entity has ceased operations and has been replaced by another entity.

This name and location matching problem is also encountered in several other contexts where third parties provide the association maintaining the data warehouse with transaction files and therefore lists of merchant names and address (locations) which are used to enhance and/or validate the data warehouse. In another third party example, a list of all locations for a large national retailer might be received, or lists of chain store names and addresses might be received. A team charged with maintaining the data warehouse is charged with the task of matching the list received against known locations for the retailer or chain.

One way to check for matches between the existing locations and new locations is through a string matching algorithm. Therefore, any solutions that might be utilized for string matching should be scalable within the framework of a database (the data warehouse) system. Third party solutions do exist for approximate string matching. However, these solutions typically have one or more drawbacks, including, the solution is cost prohibitive, is domain or tool specific, or the solution is external to the database (the data warehouse) system.

Therefore, there exists a heretofore unmet goal of developing a technique that would allow a data warehouse team to perform approximate name and address matching in order to match merchant records in a scalable manner within a database system. The desired result would be a compact and accurate data warehouse capable of supporting other downstream applications, for example, utilizing historical transaction data to predict future financial card transactions and determine if there are correlations to be made from the data.

BRIEF DESCRIPTION OF THE INVENTION

In one aspect, a computer-based method for character string matching of a candidate character string with a plurality of character string records stored within a database includes performing a clustering operation on at least a portion of the plurality of character string records, the clustering operation generating a plurality of clusters, each cluster comprising a plurality of character strings from the plurality of character string records, the plurality of character strings in each cluster are determined to be similar with respect to each other based on at least one characteristic of the plurality of character strings. The method also includes generating a set of reference character strings from the plurality of clusters, the reference character strings being selected from the plurality of character strings in each cluster, generating an n-gram representation for one of the reference character strings in the set of reference character strings, and generating an n-gram representation for the candidate character string. The method further includes determining a similarity between the n-gram representations, repeating the steps of generating an n-gram representation for one of the reference character strings in the set of reference character strings and determining a similarity between the n-gram representations for the remaining reference character strings in the set of identified reference character strings, and indexing the candidate character string within the database based on the determined similarities between the n-gram representation of the candidate character string and the n-gram representation of the reference character strings in the identified set.

In another aspect, a computer is programmed to identify a set of dissimilar reference character strings in a database including a plurality of character string records using a spanning tree, generate an n-gram representation for a candidate character string, generate an n-gram representation for each of the dissimilar reference character strings in the set, determine a similarity between the n-gram representation of the candidate character string and each n-gram representation of the set of dissimilar reference character strings, and index the candidate character string within the database based on the similarities determined in the n-gram representations.

In still another aspect, a computer-based method for approximate matching of a candidate character string to a set of reference character strings within a database includes generating a set of reference character strings from a plurality of character strings in the database using a genetic algorithm, the genetic algorithm configured to refine an initial set of the plurality of character strings according to one or more influence values, to produce at least one optimized potential reference character string, receiving a plurality of candidate character strings, for at least one candidate character string, individually comparing an n-gram representation of the candidate character string to n-gram representations for each reference character string in the set of reference character strings, and generating a binary index value that is associated with the candidate character string, the binary index value indicating a similarity between the candidate character string and each of the reference character strings.

DETAILED DESCRIPTION OF THE INVENTION

Figure 1:
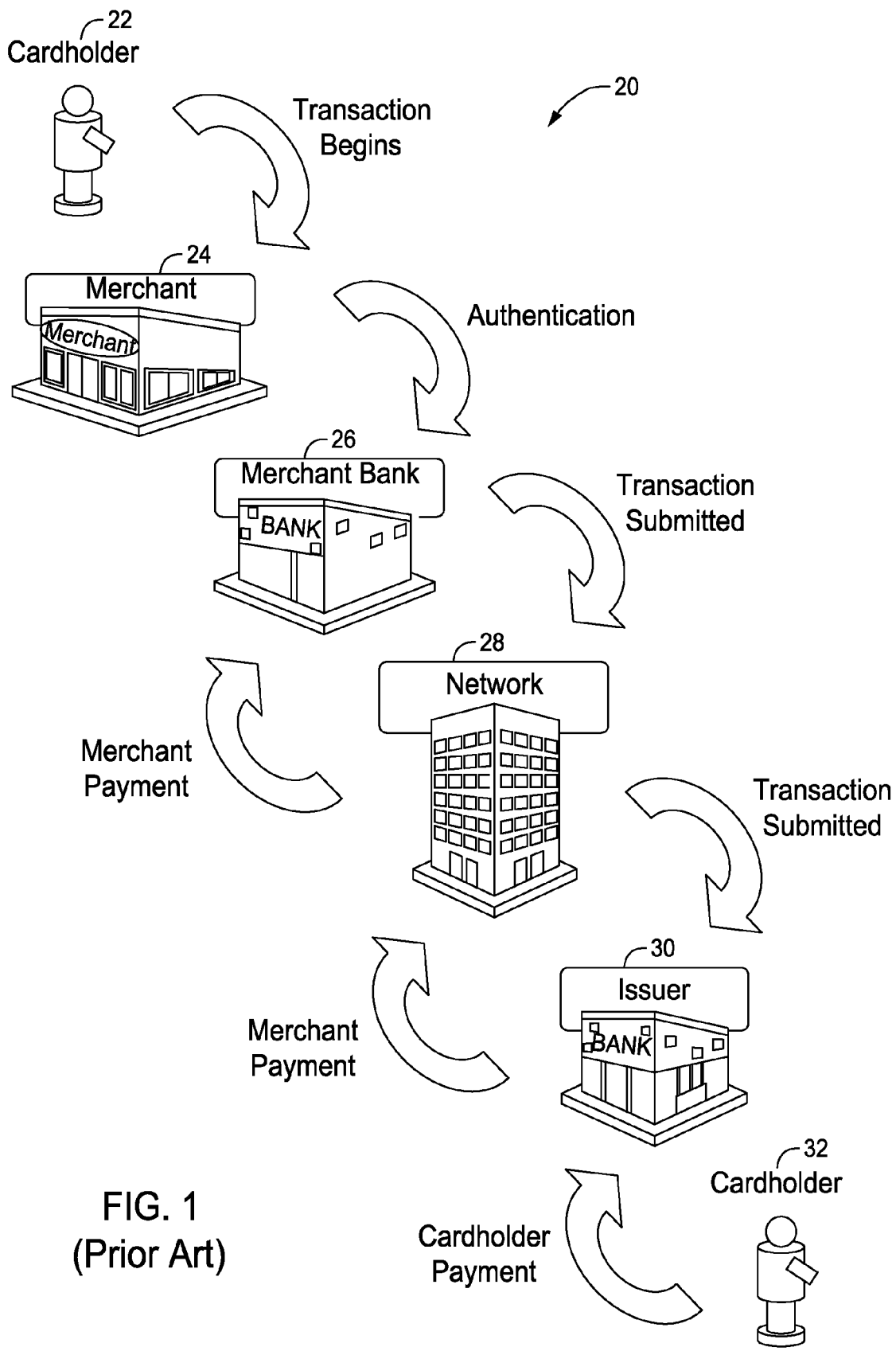
FIG. 1 is a schematic diagram illustrating an exemplary multi-party payment card industry system for enabling ordinary payment-by-card transactions.

The embodiments described herein relate to an efficient method for retrieving approximate string (e.g., character string) matches in a database, while not having to compute a similarity metric on the entire database. Through approximate string matching, for example, of received location data that varies somewhat in content, matches in location can be determined. This efficiency is accomplished by generating a binary index capturing a relative position (a degree of matching) of each string with respect to a set of reference strings spanning a space of strings for the field being matched. While described in context of merchant names and locations associated with the operation of a financial transaction card system, it is important to note that the approximate string matching technique is applicable to more general tasks such as information retrieval where instead of matching character strings of merchant name and address information. One example is utilizing the technique for the matching of documents within a computer system.

A technical effect of the systems and processes described herein include at least one of (a) a technique for performing approximate name and address matching in order to match merchant records in a scalable manner within a database system (b) allowing for the determination of a similarity metric for a candidate character string with respect to each of a plurality of reference character strings; (c) generating a binary index that captures each candidate character string's relative position to a set of reference character strings that spans the space of strings within the database for the fields being matched; and (d) retrieving approximate string matches between a candidate character string and a database that contains a plurality of character string records without having to compute the similarity metric for the entire database of records.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes described herein are not limited to the specific embodiments described herein. In addition, components of each system and each process can be practiced independent and separate from other components and processes described herein. Each component and process also can be used in combination with other assembly packages and processes.

By way of background, FIG. 1 is a schematic diagram 20 illustrating an exemplary multi-party payment card industry system for enabling ordinary payment-by-card transactions in which historical transactions are utilized at least in part with an ensemble aggregate merchant prediction system. As utilized herein, aggregate merchant refers to a high level grouping of merchant locations. More specifically, the various individual merchant locations for a retailer are aggregated together (e.g., linked to one another in a database) to form an aggregate merchant. One merchant location is therefore a component of an aggregate merchant. Typically, an aggregate merchant is utilized when referring to a chain of stores and locations are aggregated together, as further described herein, based on a number of field values stored in a database of transaction data.

The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group. Data that is associated with such transactions, as described further herein, is utilized in the art of predicting future purchasing activities Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
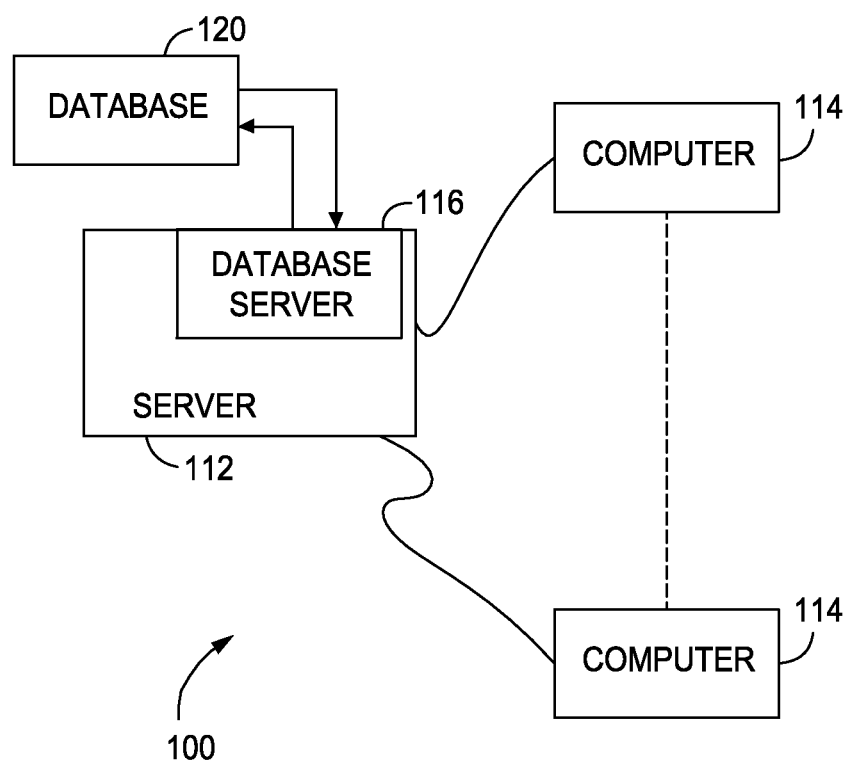
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is a payment card system used for implementing, for example, customized issuer-merchant relationships while also processing historical data associated with the transactions. In another embodiment, system 100 is a payment card system, which can be utilized by account holders for inputting processing codes to be applied to payment transactions.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, database 120 stores transaction data generated as part of sales activities conducted over the bankcard network including data relating to merchants, account holders or customers, and purchases. Database 120 further includes data relating to rewards programs and special offers including processing codes and business rules associated with the different rewards programs and special offers.

Figure 3:
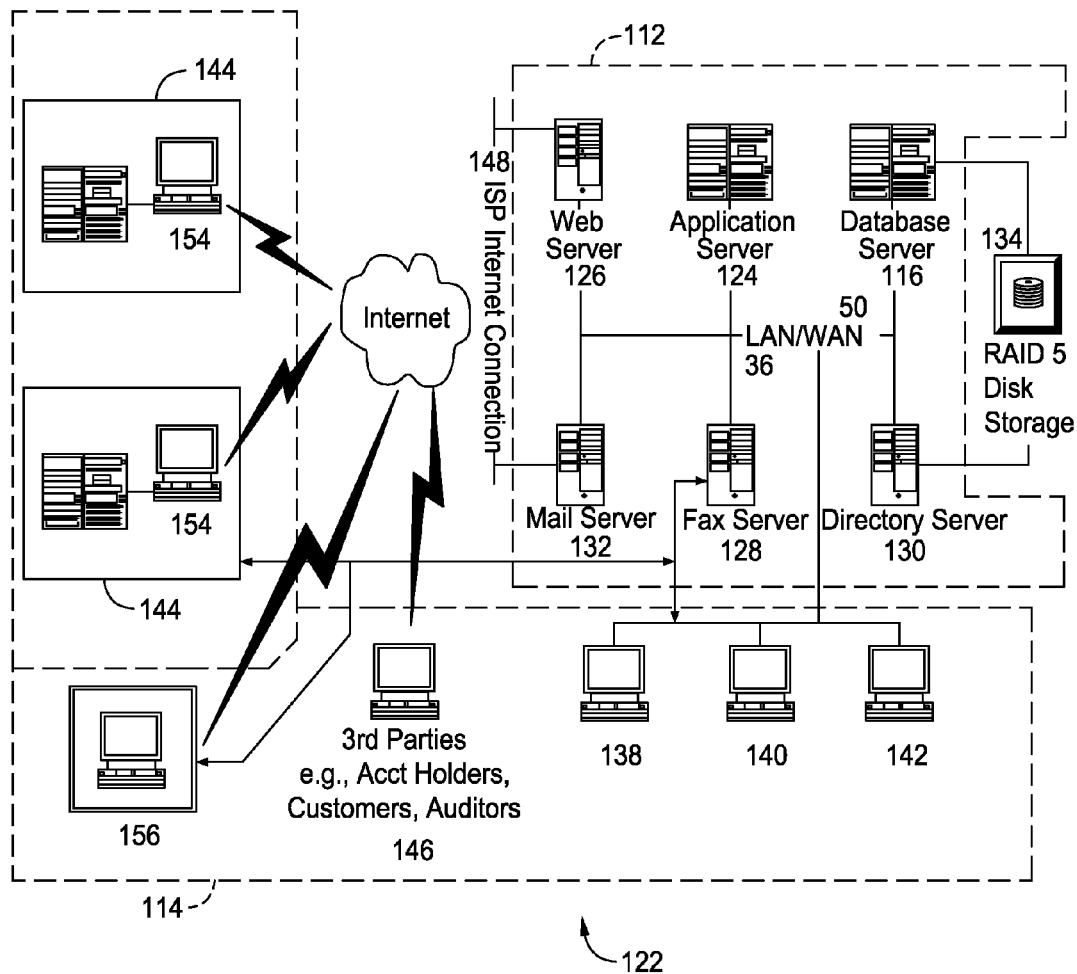
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
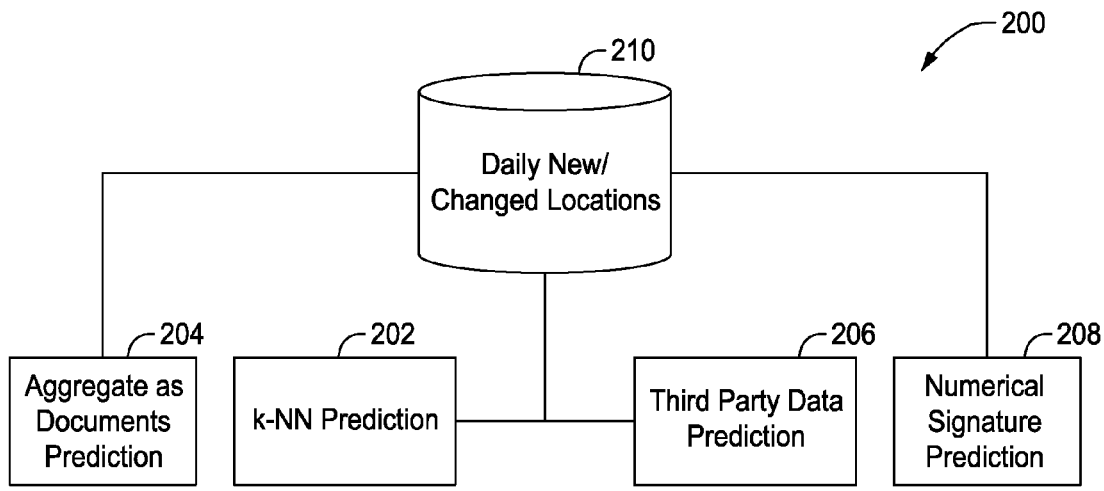
FIG. 4 is a flowchart illustrating high-level components for an ensemble aggregate merchant prediction system.

FIG. 4 is a flowchart 200 illustrating high-level functional components for one embodiment of an ensemble, or aggregated, merchant prediction system where each component provides a prediction relating to operations of a financial transaction card network. The predictions are then aggregated into a single prediction as further described. This aggregation of predictions is sometimes referred to as an ensemble prediction. One example relevant to the embodiments described herein includes aggregated predictions that relate to received merchant location data. While introduced with respect to FIG. 4, all the prediction algorithms are more fully described herein.

A first component is a similar locations prediction algorithm 202 (sometimes referred to as a k-similar location prediction algorithm) which is configured to retrieve the "k" merchant locations that are most similar to a given merchant location. The prediction algorithm 202 is further operable to classify a group of similar merchant locations as a mode group from among the retrieved "k" most similar locations.

An Aggregated Locations as Documents Prediction algorithm 204 is utilized to compute a relevance for every field and field value relative to each aggregate of locations (a high level grouping of data) in the space of known values. the results are stored as a document. The most relevant values from these documents are utilized to generate the prediction.

A Third Party Data Prediction algorithm 206, including a location matching system, is utilized where the prediction is associated with a particular third party brand. At least one input to the algorithm 206 includes transaction records, received from a third party, which are utilized in generating the prediction. In one embodiment, the prediction is generated after location matching to the third party data source is performed. A Numerical Signature Prediction algorithm 208, an embodiment of which is based largely on Benford's Law, and further based on the observed tendency for merchants belonging to the same grouping to diverge from the distribution identified by Benford in a relatively consistent manner is included in flowchart 200. The prediction resulting from algorithm 208 becomes the group of locations that have the most similar numeric distribution as compared to each merchant location.

Figure 5:
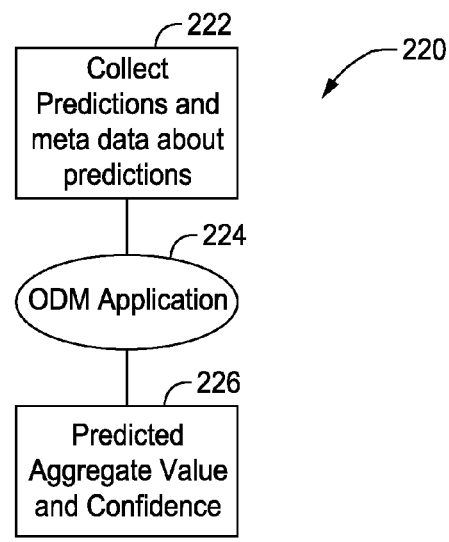
FIG. 5 is a flowchart illustrating operation of a scoring engine associated with the ensemble aggregate merchant prediction system.

A top-level statistical model and scoring engine 210, implemented in Oracle in one embodiment, utilizes the predictions from algorithms 202, 204, 206, and 208 to determine group memberships among the data that is newly received and/or stored within a database. An example of the data is merchant location data. FIG. 5 is a flowchart 220 illustrating operation of the scoring engine 210. Specifically, the scoring engine 210 utilizes 222 the merchant location predictions from algorithms 202, 204, 206, and 208, along with meta-data regarding the predictions in an Oracle Data Mining (ODM) application 224, to describe circumstances surrounding each individual prediction, then produces 226 a final prediction, from the aggregated, individual, predictions. This final prediction may be in regard to a merchant location. The application also produces a confidence score associated with the aggregated predictions relating to a plurality of algorithms 202, 204, 206, and 208.

Each of the four algorithms 202, 204, 206, and 208 are now described in additional detail.

K-Similar Locations (Algorithm 202)

Figure 6:
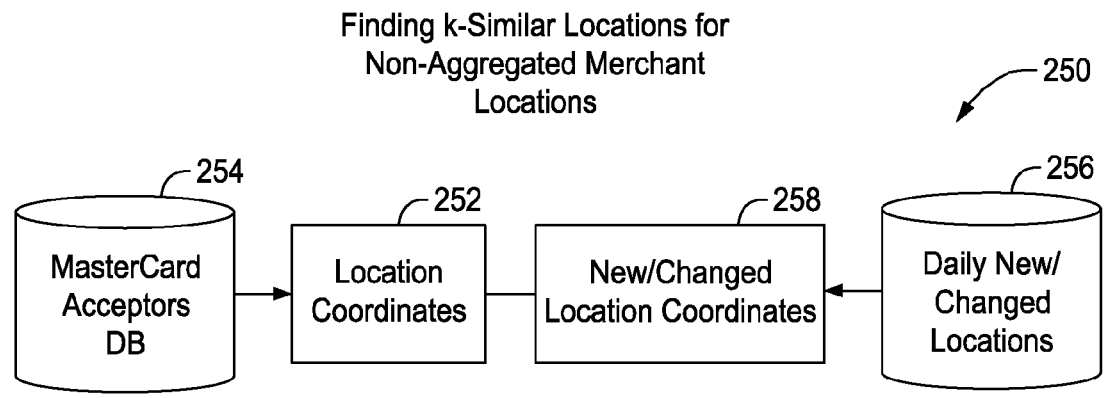
FIG. 6 is a flowchart 250 illustrating data that is input into an algorithm that classifies merchant locations.

FIG. 6 is a flowchart 250 illustrating data that is input into an algorithm 202 that classifies merchant locations based on a similarity, for example, a location similarity. A set of location level fields, or location coordinates 252, that are known to be meaningful in the context of deriving chain or collection (e.g., group) membership is identified from a database of institutions 254 that accept the financial transactions card. Additionally, data from a daily new/changed location database 256 along with their associated new/changed location coordinates 258 are provided to the below described merchant location classification algorithm.

Figure 7:
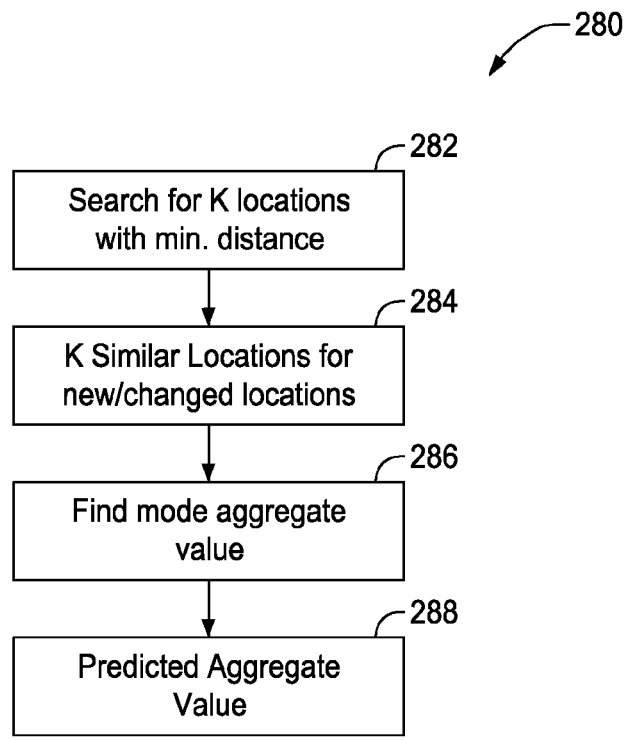
FIG. 7 is a flowchart describing an algorithm that classifies merchant locations.

FIG. 7 is a flowchart 280 describing one of the algorithms (algorithm 202 shown in FIG. 4) that is utilized to classify merchant locations into group memberships. Algorithm 202 utilizes at least the data described with respect to flowchart 250 of FIG. 6. Specifically, the merchant location data within a database is searched 282 for a number (k) of locations that are within a given distance from a given location. Additionally, locations within the given distance are searched for similarity to determine 284 any new and/or changed locations. A mode value is determined 286 by classifying the merchant locations that occur among the (k) locations within a particular feature space (a geographic area from which transaction data is input into the algorithm 202). The most frequently occurring value that results from the classification of the (k) location records has the highest weight and is referred to as a mode value, determined as described below. This mode value is returned 288 as the prediction from algorithm 202.

As further described below, the fields (location coordinates 252 and 258) are tokenized and the inverse document frequency is computed for all tokenized field values spanning the feature space. In one embodiment, for each location, a sparse matrix of weight metrics is computed for each field value and each tokenized field value as the term frequency/inverse document frequency. The prediction value is computed by joining a given location field to every other location field based on one or more of field type and field value.

The sparse matrix includes locations, field types and weights for term values, and term tokens and is generated as described in the paragraphs below.

The matrix is created that contains the inverse document frequency of all field values and tokenized field values, and in one embodiment, spans nine dimensions. In a specific embodiment, these nine dimensions include a merchant category code, an Interbank card association (ICA) code, a business region, a merchant name, a merchant phone number, an acquiring merchant identifier, a tier merchant identifier, a merchant legal name, and a federal tax identifier. These dimensions are included in all merchant location records. The inverse document frequency is the logarithm (in one specific implementation in base 2) of the quotient of the number of records divided by the number of records containing a particular value. One example is shown in Table 1. In one embodiment, this quotient is computed separately for each of the nine dimensions. The number of records is computed as the number of merchant locations. The number of records containing a particular term is computed by counting the number of merchant locations that contain each term within each field type.

TABLE 1

| Field Type | Field Value | Inverse Document Frequency |
| --- | --- | --- |
| Phone Number | 2014234177 | 12.788106546 |
| Phone Number | 8002285882 | 6.0265553135 |
| Merchant Name Token | DCC | 5.0067468324 |
| Merchant Name Token | DFQ | 8.9807516239 |
| Business Region | 01 | 1.4041323134 |

For each location, a cross-attribute normalized term frequency—double inverse document frequency weight is computed for values and tokenized values spanning the nine dimensions as illustrated in Table 2, where the nine dimensions again include merchant category code, ICA code, business region, merchant name, merchant phone number, acquiring merchant identifier, tier merchant identifier, merchant legal name, and federal tax identifier.

TABLE 2

| Location | Field Type | Field Value | Term Frequency-Double Inverse Document Frequency Weight |
| --- | --- | --- | --- |
| 100 | Phone Number | 2014234177 | .2453254 |
| 100 | Merchant Name Token | BE | .125859 |
| 100 | Merchant Name Token | ST | .1125445 |
| 100 | Tax Identifier | 525414152 | .2155224 |
| 100 | Business Region | 01 | .0252546 |

A group membership prediction and confidence for a given location is computed by joining the location to predict to all other locations on field type and field value, then summing the product of the term frequency-double/inverse document frequency weights for common field types and field values. The location results are then sorted in descending order of the resulting score and the mode group occurring among, for example, the thirteen locations with the highest score is given as the prediction. A confidence score of this prediction is represented by the number of locations among the top thirteen locations which contained the same group (predicted value), the individual weights for the k locations which belong to the predicted group, and the variance among the weights.

Aggregated Locations as Documents Prediction (Algorithm 204)

Figure 8:
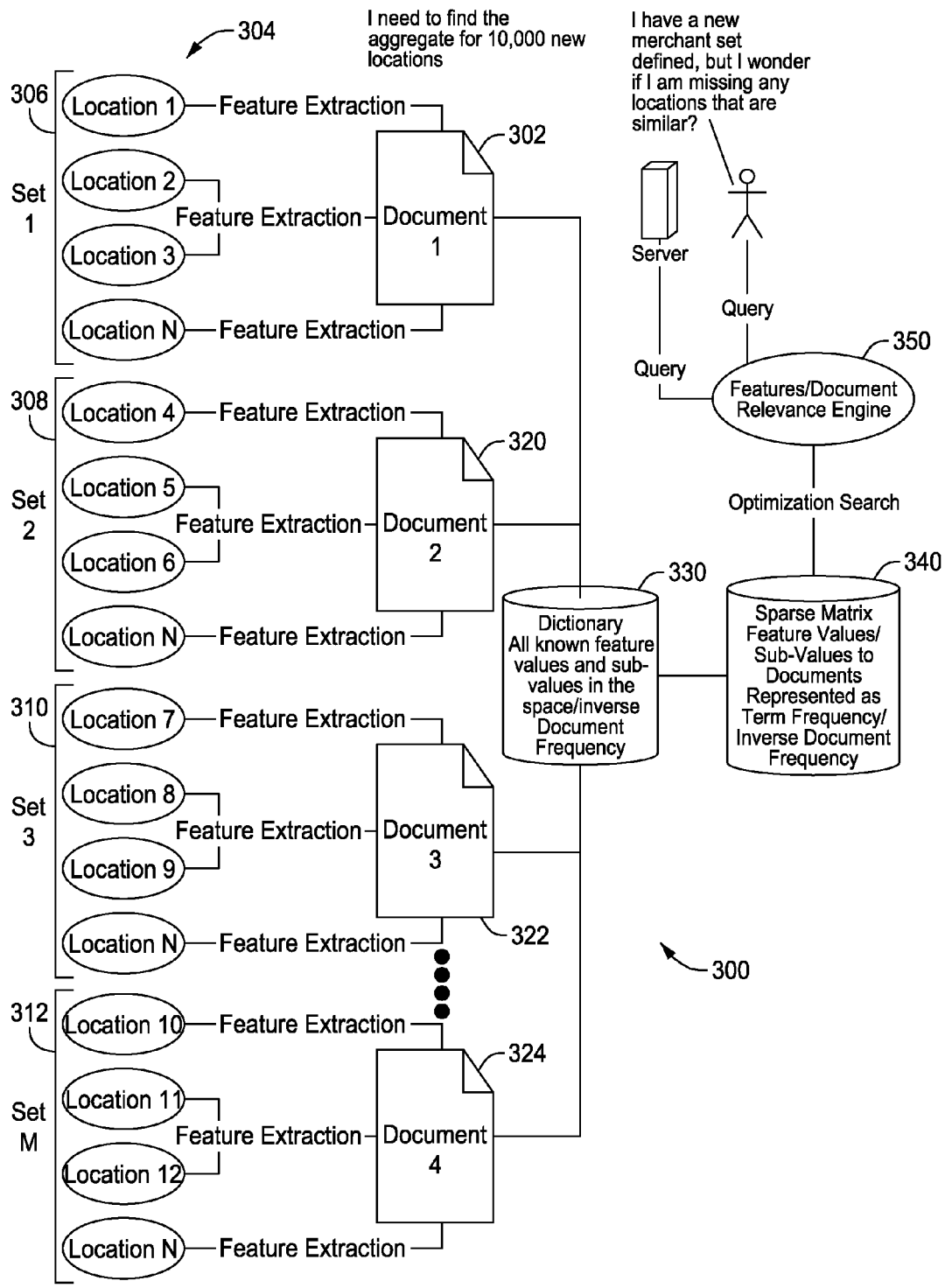
FIG. 8 is a diagram illustrating merchant aggregates and sets as documents in a classification system.

FIG. 8 is a diagram 300 illustrating locations aggregated into sets within documents as a classification system. The algorithm 204 (shown in FIG. 4) that generates the documents of aggregated locations is analogous to document relevance algorithms commonly employed by internet search engines. Specifically, a relevance of a given merchant location to each aggregate, or collection, of merchant locations is computed as described below.

To generate a document 302, relevant features, for example a street address, are extracted from the database data relating to a plurality of locations 304 and are grouped into sets, for example, set 306. For illustrative purposes, diagram 300 includes four location sets, 306, 308, 310, and 312. Set 312 is labeled as Set M, indicating that in a specific implementation the number of sets may be more or less than the four illustrated. Likewise the number of locations within a set can vary from one to "N".

The generated documents 302, 320, 322, and 324, each of which includes relevant extracted features, are collected in a dictionary 330. Utilizing the dictionary 330, a sparse matrix 340 is formed whereby the relevance of each field value and tokenized field value is computed, utilizing the extracted features, for each aggregated merchant group based on at least one of a term frequency and an inverse document frequency.

Within the sparse matrix 340, a matrix of location level weights is joined to a matrix of merchant group weights based on field type and field value. The sum of these weights is utilized, in one embodiment, by a relevance engine 350, to determine the relevance of each location to each merchant group. The merchant group with the highest relevance is returned as the predicted value described above. More specifically, the sparse matrix of groups, field types, and weights for term rules and term tokens is generated as described in the following paragraphs.

First, a matrix is created containing the inverse document frequency of all field values and tokenized field values spanning the nine dimensions listed elsewhere herein, specifically, merchant category code, ICA code, business region, merchant name, merchant phone number, acquiring merchant identifier, tier merchant identifier, merchant legal name, and federal tax identifier, across all merchant location records.

With respect to the aggregated locations as documents prediction algorithm, and as shown in Table 3, the inverse document frequency is the logarithm (base 2 in one particular embodiment) of the quotient: number of records divided by the number of records containing a particular value. In one embodiment, the inverse document frequency is computed separately for each of the nine dimensions. The number of records is computed as the number of merchant locations. The number of records containing a particular term is computed by counting the number of merchant locations that contain each term within each field type.

TABLE 3

| Field Type | Field Value | Inverse Document Frequency |
| --- | --- | --- |
| Phone Number | 2014234177 | 12.788106546 |
| Phone Number | 8002285882 | 6.0265553135 |
| Merchant Name Token | DCC | 5.0067468324 |
| Merchant Name Token | DFQ | 8.9807516239 |
| Business Region | 01 | 1.4041323134 |

For each group, the cross-attribute normalized term frequency-double inverse document frequency is computed for values and tokenized values spanning the nine dimensions of merchant category code, ICA code, business region, merchant name, merchant phone number, acquiring merchant identifier, tier merchant identifier, merchant legal name, and federal tax identifier, as shown in Table 4, and all locations belonging to each group.

TABLE 4

| Group | Field Type | Field Value | Term Frequency-Double Inverse Document Frequency |
| --- | --- | --- | --- |
| 14420 | acquiring merchant | 000000077480312 | 0.0104721165 |

TABLE 4-continued

| Group | Field Type | Field Value | Term Frequency-Double Inverse Document Frequency |
|---|---|---|---|
| 14420 | acquiring merchant | 000000077519532 | 0.0052360583 |
| 14420 | Tax identifier | 362023393 | 0.6529357998 |
| 14420 | Business Region | 05 | 0.0627648557 |
| 14420 | Merchant Name Token | TEN | 0.0011391784 |

One group membership prediction is computed for a given location by joining the rows from the (k)-similar locations matrix, which is described above, to the group matrix on field type and field value, then summing the product of the term frequency-double inverse document frequency weights for common field types and field values. The predicted group and confidence score is the group with the highest similarity score (given by the sum of the weights×weights for matching field values and tokenized values). The confidence for this prediction is the resulting score.

Third Party Data Prediction and Location Matching (Algorithm 206)

A third component of an ensemble prediction is an algorithm 206 (shown in FIG. 4) that uses third party provided data that has been matched to a database of financial transactions by merchant location. In one embodiment, these third party records are assigned a chain identifier that relates, for example, to a vendor. These chain identifiers are linked to groups of merchant locations associated with the financial transaction card brand (e.g., the card issuer). The prediction, therefore, is simply the grouping of merchant data corresponding to the chain to which a third party record has been linked. This linking follows location matching as described in the next paragraph.

A merchant location dataset is extracted from a third party data provider where the locations have been assigned (by a vendor) to a chain. Each chain within the space of third party merchant locations is assigned to the appropriate corresponding group. An approximate merchant location matching engine is used to join the set of third party merchant location records to the set of merchant location records maintained by the card issuer. The predicted group for a given location is then computed as the group corresponding to the chain corresponding to the third party location record which was matched to the card issuer merchant location record. The confidence score is the match confidence score assigned by the approximate merchant location matching engine.

Numerical Signature Prediction (Algorithm 208)

In one embodiment, a merchant numerical signature algorithm 208 (shown in FIG. 4) employs an observation regarding the distribution of numerals in the first position of a transaction amount and a transaction volume by day. To be specific, the distribution tends to be somewhat unique when various merchant data is aggregated. In addition, the distribution tends to be in consistent with the distribution proposed by Benford's Law in natural data. In a real world example, a chain of fast food restaurants may illustrate a tendency to have a particular numeral appear repeatedly as the first numeral of a transaction amount. Such a tendency can be utilized, at least partially, to identify, for example, that a franchisee location of a fast food restaurant chain is at a particular location or address.

One example of a prediction utilizing such an algorithm is a ten percent random sample of merchant locations from each aggregate merchant (grouping of merchant data). A distribution of the numbers 1-9 occurring in the first position of the transaction amount and transaction volume is computed and summarized by aggregate merchant. An angle distance between the distribution and the distribution identified by Benford's Law is computed.

A distribution of the number 1-9 occurring in the first position of the transaction amount and transaction volume is then computed for a given merchant location. The angle distance between the distribution and the distribution identified by Benford's Law is computed. The aggregate merchant with the angle distance closest to the merchant location's angle distance is given as the predicted aggregate merchant for the given location.

More specifically, and for each group, the distribution of the frequency of occurrence of each number (i.e., 1, 2, 3, 4, 5, 6, 7, 8, 9) spanning all locations within the group among the transaction count, transaction amount, and average transaction amount is computed and represented as a percentage of the whole. Said distributions are then stored in a table, a representation of which is shown in Table 5.

TABLE 5

| Group | Number | Distribution |
|---|---|---|
| 14420 | 1 | 16% |
| 14420 | 2 | 14% |
| 14420 | 3 | 20% |
| 14420 | 4 | 12% |
| 14420 | 5 | 5% |
| 14420 | 6 | 19% |
| 14420 | 7 | 2% |
| 14420 | 8 | 8% |
| 14420 | 9 | 4% |
| 58625 | 1 | 8% |
| 58625 | 2 | 14% |
| 58625 | 3 | 12% |
| 58625 | 4 | 3% |
| 58625 | 5 | 5% |
| 58625 | 6 | 3% |
| 58625 | 7 | 30% |
| 58625 | 8 | 18% |
| 58625 | 9 | 7% |

Once the distributions for each group are computed, the numerical signature for each group is determined by computing the dot product of the group's distribution vector and the distribution vector proposed by Benford's Law. This dot product (angle of divergence) divided by the sum of the squares of the vector of distributions for each group. The distribution identified in Benford's law is computed and stored in a table, a representation of which is illustrated by Table 6.

TABLE 6

| Group | Numerical Signature |
|---|---|
| 14420 | 70.9 |
| 58625 | 75.4 |

For each location, the distribution of the frequency of occurrence of each number (1, 2, 3, 4, 5, 6, 7, 8, 9) spanning the transaction count, transaction amount, and average transaction amount observed during a one month interval for the given location is computed and represented as a percentage of the whole. These distributions are then stored in a table, a representation of which is illustrated by Table 7.

TABLE 7

| Location | Number | Distribution |
|---|---|---|
| 100 | 1 | 16% |
| 100 | 2 | 14% |
| 100 | 3 | 20% |
| 100 | 4 | 12% |
| 100 | 5 | 5% |
| 100 | 6 | 19% |
| 100 | 7 | 2% |
| 100 | 8 | 8% |
| 100 | 9 | 4% |
| 200 | 1 | 8% |
| 200 | 2 | 14% |
| 200 | 3 | 12% |
| 200 | 4 | 3% |
| 200 | 5 | 5% |
| 200 | 6 | 3% |
| 200 | 7 | 30% |
| 200 | 8 | 18% |
| 200 | 9 | 7% |

Once the distributions for each location are computed, the numerical signature for each location is determined by computing the dot product of the location's distribution vector and the distribution vector proposed by Benford's Law. This dot product (angle of divergence) divided by the sum of the squares of the vector of distributions for each location, and the distribution identified in Benford's law is computed and stored in a table, a representation of which is illustrated by Table 8.

TABLE 8

| Location | Numerical Signature |
|---|---|
| 100 | 70.9 |
| 200 | 75.4 |

The predicted group membership for a given location is then computed by finding the group with the numerical signature closest to the numerical signature of the given location, with the confidence score computed as the distance between the two signatures.

Statistical Model and Scoring

As was described above with respect to FIG. 5, each predicted value from the four predictive algorithms (202, 204, 206, and 208), along with a rich set of meta-data describing the circumstances of each prediction, is collected 222 and input to an Oracle Data Mining (ODM) application 224. The ODM application 224 utilizes, in one embodiment, a statistical model (decision tree) built using labeled training data to assign a confidence score to each predicted value. The predicted value with the highest confidence score is then provided as the final predicted aggregate value for each merchant location.

Approximate String Matching

As described above, one component of an ensemble prediction is an algorithm that uses location data that has been matched, for example, to a database of financial transaction card affiliated merchant locations. Some of the data may be provided by third party sources. The embodiments described below relate to methods and systems for retrieving approximate string (e.g., character string) matches for data within a database. In the embodiments, the string matching is utilized to determine if, for example, a string representing a location is represented in the database by another string. Such an algorithm is appropriate, in various embodiments, due to the variations that occur in transaction records, especially as those records relate to merchant name and location.

An approximate string matching database system is operable to join one set of records to another set of records when no common join key, such as exactly matching, or common, field values, are present in the data. Presumably, there is some similarity in the sets of records.

Typically, when two datasets are joined in a database, they share exact values in one or more fields. When exact field values are not shared by two data sources (sets of records) due to variances within the data, the traditional approach to joining the datasets from the respective data sources is to implement a function that takes two values, then computes and returns their similarity. To use this type of function as the basis for joining data sets requires a number of iterations equal to the product of the number of records in each dataset to be joined.

As an example, if there are 10,000 records in dataset A and 500,000 records in dataset B, the similarity computation function would be called five billion times to join dataset A to dataset B. Furthermore, any indexes or function based indexes would not be used by the database optimizer when such a function is invoked. This type of data set is highly inefficient and is far too processing intensive to be used to join datasets having nontrivial data volumes.

A string matching technique has been developed, which in various embodiments, is implemented utilizing one or more of the following components. Specifically, a set of reference strings are used in a join criteria that is produced using one or more of a clustering engine, a spanning tree or other tree technique, and a genetic algorithm. These techniques seek to identify a set of very dissimilar strings present in the space of known values, which will be used as reference strings.

Another component is an n-gram frequency similarity calculation implemented in pure ASCII structured query language (SQL) to maximize performance in a relational database management system (RDBMS). Additionally, a process is implemented in the RDBMS to use the n-gram frequency similarity calculation to form a binary key, as described below, that indicates the similarity of a given record to each of the reference strings identified in the PCFA.

In one embodiment, a set of data-driven standardization functions is implemented within the RDBMS, as is a table containing the inverse document frequency (IDF) of all n-grams, and an SQL implementation of a cross-attribute weighted term frequency/inverse document frequency (TF/IDF) calculation.

One embodiment of the string matching technique includes a parameterized analytical SQL query that joins the records that share the same binary key value, then sorts them by relevance by summing the products of the TF/IDF weights of all matching n-grams. The i-th bit in the binary key is set to a logical 1 if that record matches the i-th reference string above a certain threshold.

A process is implemented within the RDBMS to assign a confidence score to each match resulting from the join, while a RDBMS data model to store the data involved in the joining of the datasets is also included.

One simple version of the dataset joining problem is to match one name (or address) against a larger set of names (or addresses) contained within a database such as an Oracle table. An example of this n-gram matching is illustrated by Table 9.

TABLE 9

| Candidate (or new)Address | Existing Merchant Address List |
|---|---|
| 10014 S Clarkson Rd. | 100 Manchester Rd |
| | 2014 Clarkson Rd |
| | 4 Main Street |
| | 10014 South Clarkson Rd |
| | 1400 Clayton Rd |

The element needed for the dataset joining solution is a metric for measuring any similarity between strings. An n-gram is simply a unique string of n characters and n-gram matching is a process for determining a match between n-grams. For the case where n is equal to two, the candidate address in Table 1 consists of the following 2-grams: "10", "00", "01", "14", "4<space>", "<space>S", "S<space>", "<space>C", "C1", "1a", ..., "Rd".

Table 10 summarizes the n-gram matching algorithm, which includes determining the n-gram frequency vector for the candidate string (e.g., Candidate_array), determining the n-gram frequency vector for each entry in the candidate match database (e.g., Candidate_Match_Array), measuring a degree of similarity between the Candidate_Array and the Candidate_Match_Array, and retaining those candidate matches exceeding a specified threshold. For example, "JoJo's Diner" becomes:

TABLE 10

| Candidate_Array | 2-gram | Frequency |
|---|---|---|
| 1 | "Jo" | 2 |
| 2 | "oJ" | 1 |
| 3 | "o'" | 1 |
| 4 | "'s" | 1 |
| 5 | "s " | 1 |
| 6 | " D" | 1 |
| 7 | "Di" | 1 |
| 8 | "in" | 1 |

TABLE 10-continued

| Candidate_Array | 2-gram | Frequency |
|---|---|---|
| 9 | "ne" | 1 |
| 10 | "er" | 1 |

Tables 11, 12, and 13 are examples of an n-gram Matching Metric. The "Inner Product" is the dot product of the array, the "Magnitudes" are the square root of the sum of the squares, the "Cosine (of the angle)" is the dot product divided by the product of the Magnitudes, and the angle is the inverse Cosine of the dot product divided by the product of the Magnitudes.

TABLE 11

| String Array | String 1 510 West Third | Array 1 <- Freq | Array 2 Freq -> | String 2 512 West Third |
|---|---|---|---|---|
| 1 | "51" | 1 | 1 | "51" |
| 2 | "10" | 1 | 0 | "10" |
| 3 | "0<space>" | 1 | 0 | "0<space>" |
| 4 | "12" | 0 | 1 | "12" |
| 5 | "2<space>" | 0 | 1 | "2<space>" |
| 6 | "<space>W" | 1 | 1 | "<space>W" |
| 7 | "We" | 1 | 1 | "We" |
| 8 | "es" | 1 | 1 | "es" |
| 9 | "st" | 1 | 1 | "st" |
| 10 | "t<space>" | 1 | 1 | "t<space>" |
| 11 | "<space>T" | 1 | 1 | "<space>T" |
| 12 | "Th" | 1 | 1 | "Th" |
| 13 | "hi" | 1 | 1 | "hi" |
| 14 | "ir" | 1 | 1 | "ir" |
| 15 | "rd" | 1 | 1 | "rd" |
| Inner Product | | 11 | | |
| Magnitude 1 | | 3.605551 | | |
| Magnitude 2 | | | 3.605551 | |
| Cos(Angle) | | 0.846154 | | |
| Angle (degrees0 | | 32.20423 | | |

TABLE 12

| String Array | String 1 512 West Third | Array 1 <- Freq | Array 2 Freq -> | String 2 510 North Third |
|---|---|---|---|---|
| 1 | "51" | 1 | 1 | "51" |
| 2 | "10" | 0 | 1 | "10" |
| 3 | "0<space>" | 0 | 1 | "0<space>" |
| 4 | "12" | 1 | 0 | "12" |
| 5 | "2<space>" | 1 | 0 | "2<space>" |
| 6 | "<space>W" | 1 | 0 | "<space>W" |
| 7 | "We" | 1 | 0 | "We" |
| 8 | "es" | 1 | 0 | "es" |
| 9 | "st" | 1 | 0 | "st" |
| 10 | "t<space>" | 1 | 0 | "t<space>" |
| 11 | "<space>T" | 1 | 1 | "<space>T" |
| 12 | "Th" | 1 | 1 | "Th" |
| 13 | "hi" | 1 | 1 | "hi" |
| 14 | "ir" | 1 | 1 | "ir" |
| 15 | "rd" | 1 | 1 | "rd" |
| 16 | "<space>N" | 0 | 1 | "<space>N" |
| 17 | "No" | 0 | 1 | "No" |
| 18 | "or" | 0 | 1 | "or" |
| 19 | "rt" | 0 | 1 | "rt" |
| 20 | "th" | 0 | 1 | "th" |
| 21 | "h<space>" | 0 | 1 | "h<space>" |
| Inner Product | | 6 | | |
| Magnitude 1 | | 3.605551275 | | |
| Magnitude 2 | | | 3.741657 | |
| Cos(Angle) | | 0.44474959 | | |
| Angle (degrees0 | | 63.59268128 | | |

TABLE 13

| String Array | String 1 510 North Third | Array 1 <- Freq | Array 2 Freq -> | String 2 510 N Third |
|---|---|---|---|---|
| 1 | "51" | 1 | 1 | "51" |
| 2 | "10" | 1 | 1 | "10" |
| 3 | "0" | 1 | 1 | "0" |
| 4 | "N" | 1 | 1 | "N" |
| 5 | "No" | 1 | 0 | "No" |
| 6 | "or" | 1 | 0 | "or" |
| 7 | "rt" | 1 | 0 | "rt" |
| 8 | "th" | 1 | 0 | "th" |
| 9 | "h" | 1 | 0 | "h" |
| 10 | "T" | 1 | 1 | "T" |
| 11 | "Th" | 1 | 1 | "Th" |
| 12 | "hi" | 1 | 1 | "hi" |
| 13 | "ir" | 1 | 1 | "ir" |
| 14 | "rd" | 1 | 1 | "rd" |
| 15 | | | | |
| 16 | | | | |
| 17 | | | | |
| 18 | | | | |
| 19 | | | | |
| 20 | | | | |
| 21 | | | | |
| Inner Product | | 9 | | |
| Magnitude 1 | | 3.741657 | | |
| Magnitude 2 | | | 3 | |
| Cos(Angle) | | 0.801784 | | |
| Angle (degrees0 | | 36.69923 | | |

Reference Strings

The above tables and description illustrate an ability to represent strings quantitatively, and measure the similarity between them. At this point an index for each record in the database can be built based on its relative position to a small set of reference strings.

By choosing reference strings, a new record's relative position to each of the reference strings can be computed. Additionally, every record in the database has its own pre-computed position relative to the reference strings. Therefore, approximate matches can be found by retrieving those records indexed in the same proximity without having to compute the full similarity metric between the new record and the entire database. One goal of reference string selection is to choose records that are dissimilar, thus giving a better perspective. One approach to reference string selection is outlined in the following paragraphs.

Reference strings are identified by taking a sample of strings from the database being indexed. The n-gram representations for each string in the sample are generated by creating a vector of frequencies where the i-th component of the vector contains the number of times that n-gram occurred in that string. A matrix of similarities is generated measuring the similarity between every pair of sample strings using the cosine similarity metric.

Techniques for finding dissimilar components in a collection of similarity data may include, but are not limited to, a clustering engine, a spanning tree or other tree technique, and a genetic algorithm.

Binary Index and Information Retrieval

To group together similar strings so that an index can be created to provide fast candidate retrieval during approximate string matching, each potential candidate record and each comparison record is compared to each of the reference strings using the n-gram frequency similarity SQL calculation.

If the similarity calculation yields a score higher than a predefined threshold, the position of the binary key corresponding to the reference string is assigned a value of 1. If the score is below the threshold, the corresponding position of the key is assigned a 0.

NGRAM Similarity Calculation

An SQL query has been developed that forms a two-dimensional vector containing the frequencies of occurrence of all unique N-GRAMS present within two given strings. The query then divides the sum of each frequency product by the square of the magnitude of each dimension of the frequency vector to arrive at a normalized similarity metric.

Such a calculation is represented by the following example in which comparison string A is "MASTERCARD", and comparison string B is "MASTERCHARGE". The following table, Table 14, is a two-dimensional vector containing the frequencies of occurrence of every unique n-gram present within the two comparison strings:

TABLE 14

| | A | B |
|---|---|---|
| MA | 1 | 1 |
| AS | 1 | 1 |
| ST | 1 | 1 |
| TE | 1 | 1 |
| ER | 1 | 1 |
| RC | 1 | 1 |
| CA | 1 | 0 |
| AR | 1 | 1 |
| RD | 1 | 0 |
| CH | 0 | 1 |
| HA | 0 | 1 |
| RG | 0 | 1 |
| GE | 0 | 1 |

The magnitude of string A is computed as the square root of the sum of squares for each frequency value in dimension A, specifically, the magnitude of string A is 3.0. The magnitude of string B is computed as the square root of the sum of squares of each frequency value in dimension B, specifically, magnitude B is 3.3166247903554. The dot product of the vector is computed, and for this example the dot product is 7.0 (the number of table entries where both A and B have a value of 1). The similarity is computed as the dot product/(magnitude A×Magnitude B), or 0.703526470681448 for the illustrative example.

Forming Binary Key Values

If the similarity calculation yields a score higher than a predefined threshold, the position of the binary key corresponding to the reference string is assigned a value of 1. If the score is below the threshold, the corresponding position of the key is assigned a 0. In one embodiment, a process for determining binary key position is implemented using a combination of SQL and PL/SQL. The implementation of the algorithm minimizes the number of required string comparison calculations by using analytical structured query language to automatically assign a given string a binary key value if a binary key value had been calculated for that exact value in an earlier iteration within the algorithm. This optimization is accomplished in SQL.

A unique identifier and each binary key value are stored in a partitioned index organized table (IOT) in the RDBMS. Each unique dataset is stored within a single partition, and no two datasets share the same partition. To maximize load performance, the load of each dataset into this table is accomplished using a create table as select (CTAS) and partition exchange. The data within each partition is stored in order of the binary key values, to maximize join performance.

Data Standardization

To improve the accuracy of the similarity comparisons and the distribution of the binary key values, the data is standardized, in one embodiment, for known abbreviations and synonyms. To accomplish such data standardization, a table is created that contains all known variations and synonyms for various field types, along with their respective standard representation. An algorithm then works to tokenize each data element and map any known variations or synonyms to their standard forms.

IDF Table

For faster performance when calculating the weighted TF/IDF for all n-grams present in the fields involved in the approximate matching join, a table is built containing the inverse document frequency of all two character n-grams present within the space of candidate records. The formation of all n-grams within the space is accomplished through PL/SQL while the IDF calculation is done in ASCII SQL. The IDF table stores the IDF value for each possible n-gram for each category of data. The table is index organized according to data category and n-gram to maximize join performance.

Cross-Attribute Weighted TF/IDF

To assign a weight, or significance, to each two character n-gram present in a given record for each field involved in the approximate matching join, a cross-attribute weighted term frequency/inverse document frequency TF/IDF value is computed for each n-gram value. The n-gram terms and their respective frequencies of occurrence within each given record and field are computed using a pipelined table function that takes a REF_CURSOR as input. This calculation is slightly different from traditional weighted TF/IDF calculations, in that after calculating the TF/IDF for each n-gram within each field, it adjusts the weights for all n-grams in each field up or down according to the overall weight of the n-grams present in the other fields of the same record. This technique results in a record level dynamic adjustment to the relative weight of matching n-grams according to the overall significance of the value in each field.

As mentioned above, the unique identifiers for each record in a given dataset, along with their n-gram terms and the calculated weight scores are stored in a partitioned Index Organized Table (IOT) to maximize join performance. The table is organized according to unique identifier, data category, and n-gram term value. Each unique dataset is stored in a separate partition within the table. Each partition is loaded using a create table as select and partition exchange to maximize load performance.

Join Query

Once the binary keys and cross-attribute TF/IDF calculations have been loaded into the RDBMS, an analytical join query is employed to retrieve all candidate match records and sort them according to their relevance or match quality as compared to the comparison record. This is accomplished by first joining together the records with matching binary key values, then joining the n-gram values for the resulting candidate records and calculating the sum of the product of their weights.

Confidence Score Assignment

The results of the join query are sent through a function implemented within the RDBMS that performs a very low level comparison on each input and candidate record, then assigns a confidence score using a statistical model for use in the Oracle data mining application described above.

Figure 9:
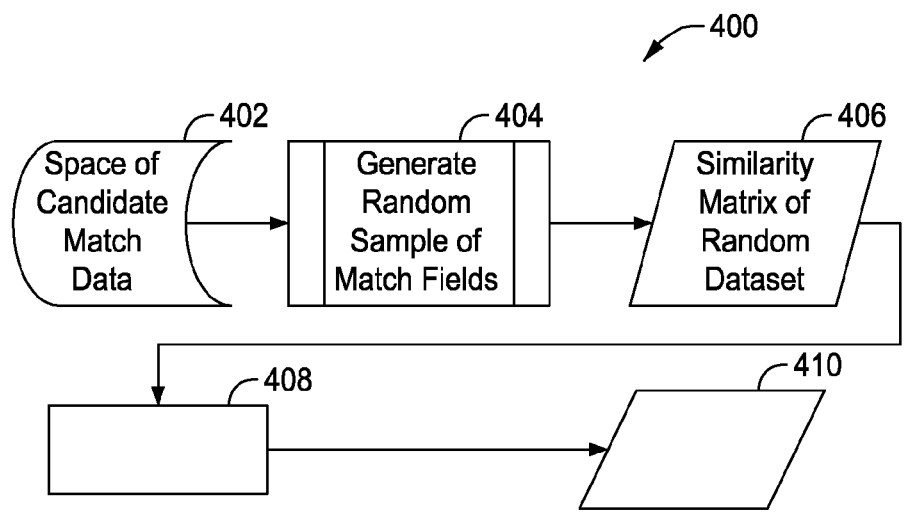
FIG. 9 is a flowchart illustrating determination of a set of reference character strings, or principal components, within a database.
Figure 10:
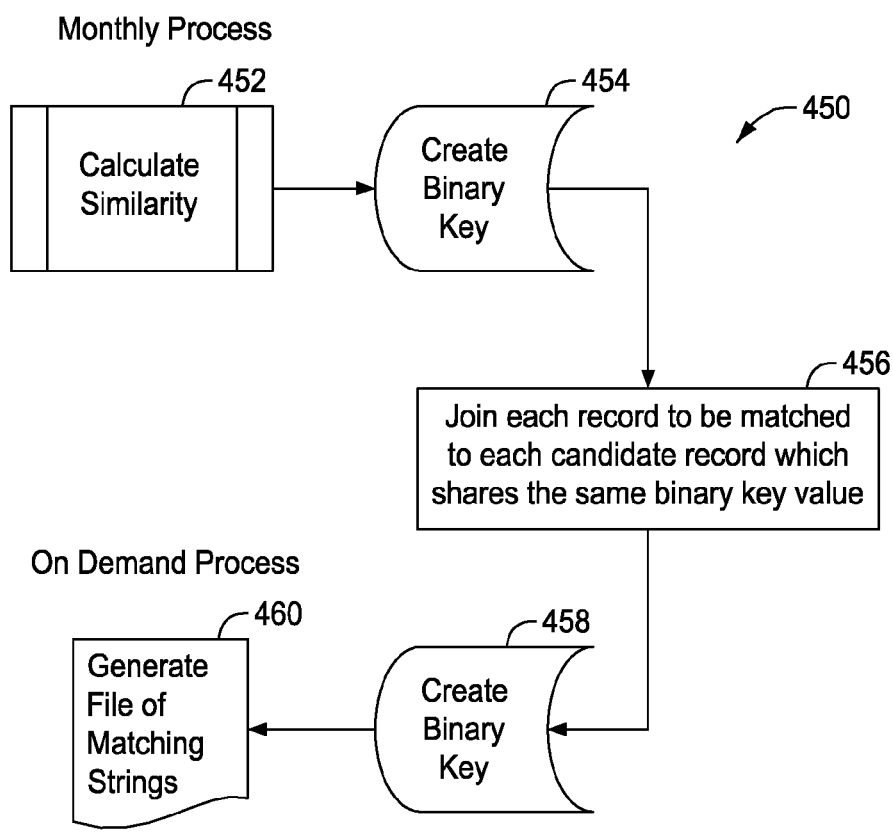
FIG. 10 is a flowchart illustrating utilization of a set of reference strings to determine a similarity metric for a candidate character string.

The above described processes associated with approximate string matching are further illustrated by FIGS. 9 and 10 which are flowcharts 400 and 450 respectively illustrating determination of a set of reference character strings, and illustrating utilization of the set of reference strings to determine a similarity metric for a candidate character string. Sample strings determined using one or more of the clustering engine, spanning tree or other tree technique, and the genetic algorithm are retained to form the set of reference strings. The similarity metric is based on a number of matching n-grams in a comparison of the candidate character string and the individual character strings within the determined set of reference character strings.

Specifically, and referring to FIG. 9, a database includes a space of potential candidate match data 402, which is sometimes referred to herein as a database of character strings (e.g., name and/or location data for merchants). As described herein, a random sample of match fields, or database records is generated 404, based on, for example, an optimization search for a set of dissimilar character strings. A similarity matrix is calculated 406, and at least one of the clustering engine, the spanning tree or other tree technique, and the genetic algorithm is applied 408, resulting in indicators 410, each of which refer to a corresponding reference character string. This set of reference character strings is useful for comparison against candidate character strings, because the set has been specifically generated to include dissimilar data.

Now referring to FIG. 10, upon receipt of a candidate character string, a similarity is calculated 452 between each candidate character string and each reference character string. As described herein, such comparison might be based on a distance to centroid or a reference string of a cluster, a grouping of leaves in a tree, or a child at a selected generation or degree of similarity. For fast and efficient approximate character string matching, records (reference character strings) are joined 456 to candidate character strings based on the comparison of their respective binary key records. Such a process allows a user to quickly retrieve high probability matches between reference character strings (which may include merchant name and/or location data) to a candidate character string which might be representative of merchant name and/or location data. By creating 458 a binary key for each database record to be matched, a file of matching reference character strings to candidate character strings can be generated 460.

Figure 11:
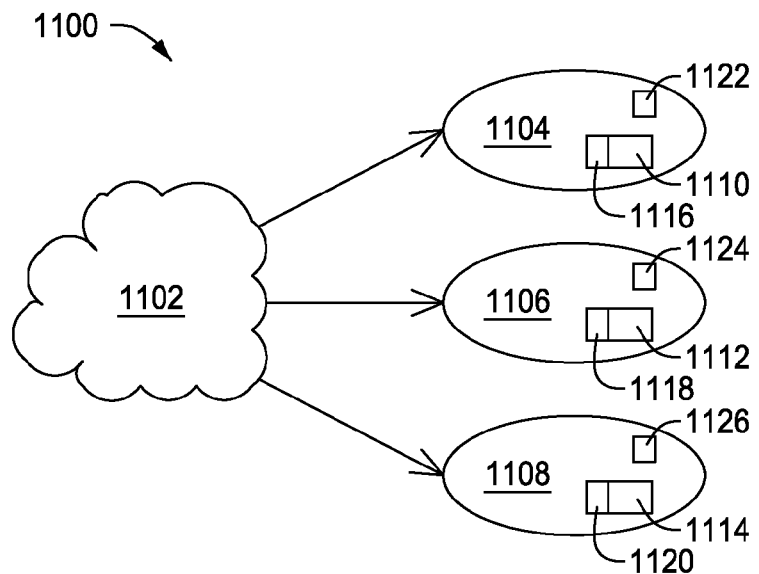
FIG. 11 is a data flow diagram illustrating a clustering process in accordance with an exemplary embodiment of the present invention.

FIG. 11 is a data flow diagram illustrating a clustering process in accordance with an exemplary embodiment of the present invention. In the exemplary embodiment, a subset 1102 of the character strings are selected and processed through a clustering engine. The clustering engine processes the selected character strings to generate a predetermined number of clusters 1104, 1106, 1108, where the character strings 1110, 1112, 1114 within each cluster are similar and character strings from cluster-to-cluster are dissimilar. The clustering engine is optimized to maximize the similarity of character strings in each cluster and to maximize the dissimilarity between character strings of different clusters. Representative character strings 1116, 1118, 1120 of each cluster are selected to generate a set of dissimilar reference character strings. Representative character strings may be selected as being the closest character string to a centroid 1122, 1124, 1126 of the cluster or may be randomly chosen from the cluster.

Figure 12:
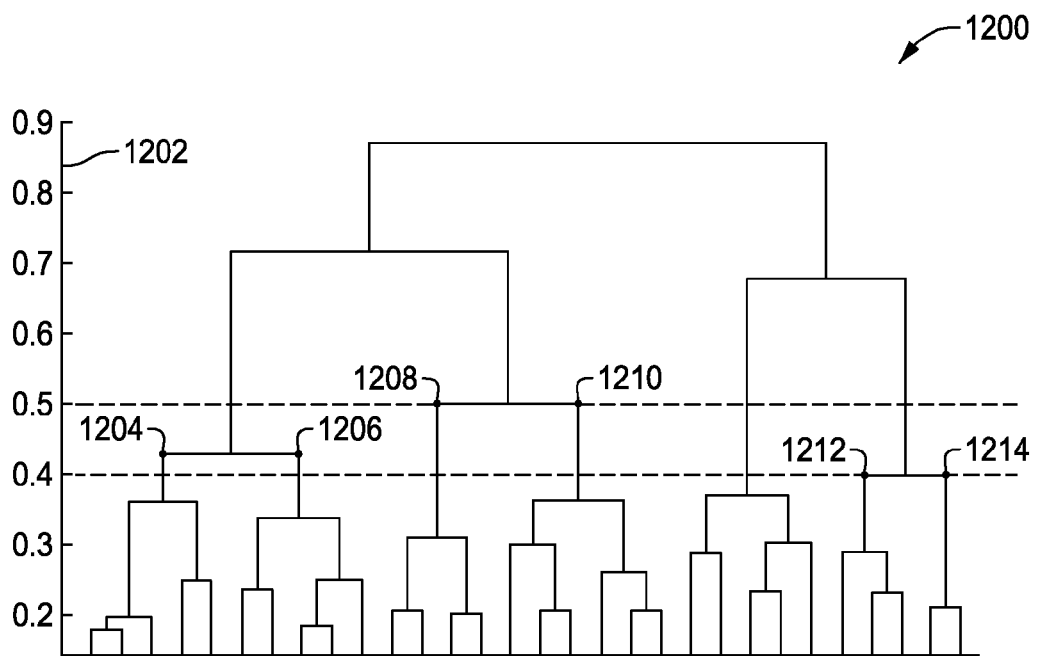
FIG. 12 is a data flow diagram illustrating a spanning tree process in accordance with an exemplary embodiment of the present invention.

FIG. 12 is a diagram illustrating a spanning tree 1200 in accordance with an exemplary embodiment of the present invention. Spanning tree 1200 of a connected, undirected graph includes all the vertices and at least some of the edges of the graph, where the graph represents the plurality of character strings, the vertices represent individual character strings, and the edges represent a similarity (either closely similar or very dissimilar) of connected vertices. The spanning tree of the graph is a selection of edges that form a tree spanning every vertex, such that, every vertex lies in the tree, but no cycles are formed. A spanning tree of a connected graph can also be defined as a maximal set of edges of the graph that contains no cycle, or as a minimal set of edges that connect all vertices. In various embodiments, it is useful to find a minimum spanning tree of the weighted graph. Reference character strings may be selected or determined after formation of the tree using predetermined criteria or criteria selected by the user. One such tree may be represented as a dendrogram as shown. In various embodiments, selection of reference character strings may be performed manually or automatically, for example, by using a scale range along an axis to determine the vertices that represent individual character strings or by permitting the tree to progress until a predetermined number of vertices are left in the graph. In the exemplary embodiment, a cutoff at 0.4-0.5 on a y-axis 1202 would yield six vertices within the range, 1204, 1206, 1208, 1210, 1212, 1214.

Figure 13:
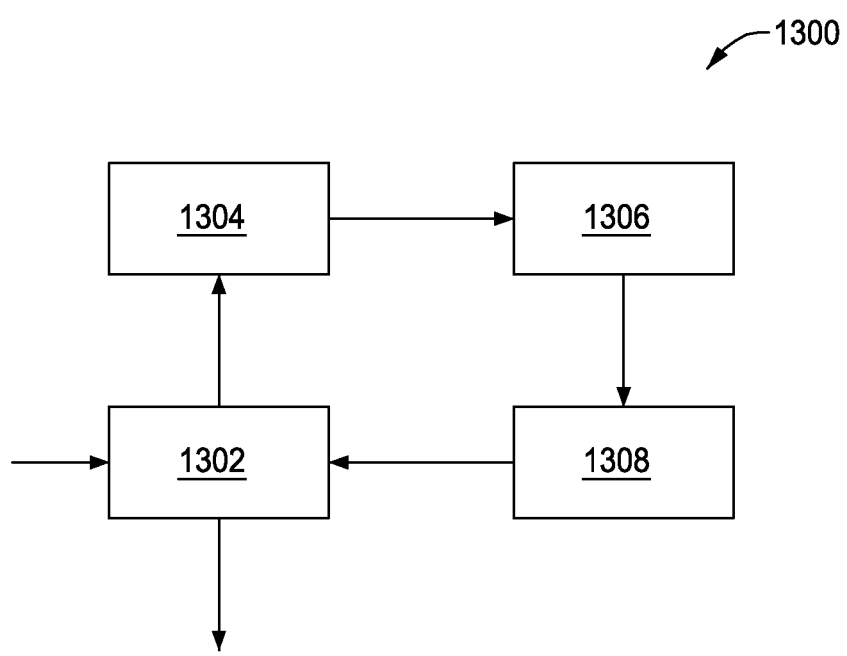
FIG. 13 is a data flow diagram illustrating a genetic algorithm process in accordance with an exemplary embodiment of the present invention.

FIG. 13 is a data flow diagram illustrating a genetic algorithm process in accordance with an exemplary embodiment of the present invention. In still another embodiment, the generated reference character strings are optimized via a genetic algorithm according to a plurality of influence values. These influence values can be defined by a user via a user interface. The genetic algorithm generates new reference character strings via genetic operators, such as inheritance, mutation, selection, and crossover, and evaluates the newly generated reference character strings for fitness according to the influence values. The reference character strings having the best fitness are retained, and another generation of reference character strings is produced by the genetic operators. This can continue until a termination event occurs, such as a set number of generations or a threshold fitness value. The resulting reference character strings can be provided to a user for review at the user interface or incorporated into a further process directly. In the exemplary embodiment, the genetic algorithm is configured to refine an initial set 1302 of the plurality of character strings according to one or more influence values, the plurality of character strings are processed in a reproduction module 1304 where, for example, an inheritance influence value is applied. A modification module 1306 may be used to apply a mutation influence value. An evaluation module 1308 may be used to select results that meet one or more fitness criteria used to determine whether that resultant character strings are progressing towards a desired level of dissimilarity. Character strings not meeting the fitness criteria may be discarded or otherwise processed. The genetic algorithm process iteratively many times until, for example, a generation limit is met or a desired level of fitness is achieved, which produces at least one optimized potential reference character string.

While the invention has been described in terms of various specific embodiments, those skilled in the art will recognize that the invention can be practiced with modification within the spirit and scope of the claims.

What is claimed is:

1. A computer-based method for character string matching of a candidate character string with a plurality of character string records stored within a database, said method comprising:
    a) performing a clustering operation on at least a portion of the plurality of character string records, the clustering operation generating a plurality of clusters, each cluster comprising a plurality of character strings from the plurality of character string records, the plurality of character strings in each cluster are determined to be similar with respect to each other based on at least one characteristic of the plurality of character strings, the clustering engine optimized to maximize the similarity of character strings in each cluster and to maximize the dissimilarity between character strings of different clusters;
    b) generating a set of reference character strings from the plurality of clusters, the reference character strings being selected from the plurality of character strings in each cluster;
    c) generating an n-gram representation for one of the reference character strings in the set of reference character strings;
    d) generating an n-gram representation for the candidate character string;
    e) determining a similarity between the n-gram representations;
    f) repeating steps c) and e) for the remaining reference character strings in the set of identified reference character strings; and
    g) indexing the candidate character string within the database based on the determined similarities between the n-gram representation of the candidate character string and the n-gram representation of the reference character strings in the identified set.

2. A computer-based method according to claim 1 wherein determining a similarity between the n-gram representations comprises:
    computing a two-dimensional vector containing a frequency of occurrence of all unique n-grams in the candidate character string and a frequency of occurrence of all unique n-grams in the reference character string; and
    computing a similarity metric for the candidate character string, with respect to the reference character string, based on the two-dimensional vector.

3. A computer-based method according to claim 2 wherein computing a similarity metric for the candidate character string comprises using a structured query language calculation to compare contents of the two-dimensional vector.

4. A computer-based method according to claim 2 wherein computing a similarity metric comprises:
    determining a magnitude of the vector associated with the candidate character string as magnitude A;
    determining a magnitude of the vector associated with the reference character string as magnitude B;
    computing a dot product between the two vectors; and
    computing the similarity metric according to (dot product/ (magnitude A×magnitude B)).

5. A computer-based method according to claim 2 wherein computing a similarity metric comprises implementing an n-gram frequency similarity calculation in ASCII structured query language.

6. A computer-based method according to claim 5 further comprising using the n-gram frequency similarity computation to form a binary key that indicates a similarity between the candidate character string and each of the identified reference character strings.

7. A computer-based method according to claim 1 wherein indexing the candidate character string within the database comprises:
    implementing an n-gram frequency similarity calculation;
    using the calculation to form binary keys that indicates a similarity between a record associated with the candidate character string and records associated with each of the identified reference character strings;
    joining records that share the same binary key value; and sorting the joined records by relevance by summing the products of the frequency weights of all matching n-grams.

8. A computer-based method according to claim 1 wherein indexing the candidate character string comprises generating a matrix of similarity metrics for the candidate character string as compared to the set of reference character strings.

9. A computer-based method according to claim 1 wherein indexing the candidate character string comprises:
assigning a binary key corresponding to the reference character string a value of 1 if the similarity metric is above a predefined threshold; and
assigning a binary key corresponding to the reference character string a value of 0 if the similarity metric is below the predefined threshold.

10. A computer-based method according to claim 1 wherein generating a set of reference character strings from the plurality of clusters comprises selecting character strings closest to a centroid of each cluster.

11. A computer system for use with a payment card interchange network, said system comprising a memory device and a processor in communication with the memory device, the computer system is programmed to:
identify a set of dissimilar reference character strings in a database including a plurality of character string records using a spanning tree, the set of dissimilar reference character strings present in the space of known values and determined to be relatively highly dissimilar;
generate an n-gram representation for a candidate character string;
generate an n-gram representation for each of the dissimilar reference character strings in the set using a vector of frequencies where the i-th component of the vector contains the number of times that an n-gram occurred in that string;
determine, using a similarity metric a similarity between the n-gram representation of the candidate character string and each n-gram representation of the set of dissimilar reference character strings to generate a matrix of similarities; and
index the candidate character string within the database based on the similarities determined in the n-gram representations.

12. A computer according to claim 11 wherein to determine a similarity between the n-gram representation of the candidate character string and each n-gram representation of the set of dissimilar reference character strings, said computer is further programmed to:
compute two-dimensional vectors containing a frequency of occurrence of all unique n-grams in the candidate character string and all unique n-grams in one of the reference character strings for each of the reference character strings; and
compute a similarity metric for the candidate character string, with respect to each reference character string, based on the two-dimensional vectors.

13. A computer according to claim 12 wherein to compute the similarity metric, said computer is programmed to utilize a structured query language calculation to compare contents of the two-dimensional vectors.

14. A computer according to claim 11 wherein to index the candidate character string, said computer is programmed to:
assign a binary key corresponding to the reference character string a value of 1 if the determined similarity is above a predefined threshold; and
assign a binary key corresponding to the reference character string a value of 0 if the determined similarity is below the predefined threshold.

15. A computer according to claim 11 wherein said computer is further programmed to select a spanning tree root from the plurality of character string records.

16. A computer-based method for approximate matching of a candidate character string to a set of reference character strings within a database using a computing device having a processor and a memory, said method comprising:
generating a set of reference character strings from a plurality of character strings in the database using a genetic algorithm, the genetic algorithm configured to refine an initial set of the plurality of character strings according to one or more influence values, to produce at least one optimized potential reference character string;
determining an n-gram representation of each of the reference character strings in the set of reference character strings generated using the genetic algorithm;
receiving a plurality of candidate character strings;
determining an n-gram representation of each of the plurality of received candidate character strings;
for at least one candidate character string, individually comparing an n-gram representation of the candidate character string to n-gram representations for each reference character string in the set of reference character strings; and
generating a binary index value that is associated with the candidate character string, the binary index value indicating a similarity between the candidate character string and each of the reference character strings.

17. A computer-based method according to claim 16 wherein the genetic algorithm is configured to produce a new set of at least one optimized potential reference character string in response to an adjustment of the values of at least one of the one or more influence values by a user.

18. A computer-based method according to claim 16 wherein individually comparing an n-gram representation of the candidate character string to n-gram representations for each reference character string comprises:
a) determining a magnitude (A) of a vector associated with the n-gram representation of the candidate character string;
b) determining a magnitude (B) of a vector associated with the n-gram representation of one of the reference character strings as magnitude B;
c) computing a dot product between the two vectors; and
d) computing a similarity metric for the candidate character string with respect to the reference character string according to (dot product/(magnitude A×magnitude B)); and
repeating steps b), c), and d) for each reference character string.

19. A computer-based method according to claim 16 wherein the one or more influence values includes at least one of inheritance, mutation, selection, and crossover that are selected by a user.

20. A computer-based method according to claim 16 further comprising:
joining records that share the same binary index value; and
sorting the joined records by relevance by summing the products of the frequency weights of all matching n-gram representations.

* * * * *